(12) United States Patent
Tung et al.

(10) Patent No.: US 11,636,407 B2
(45) Date of Patent: *Apr. 25, 2023

(54) FRAMEWORK FOR CLASSIFYING FORMS AND PROCESSING FORM DATA

(71) Applicant: SAP SE, Walldorf (DE)

(72) Inventors: Yuan Tung, Palo Alto, CA (US); Lalitha Rajagopalan, Palo Alto, CA (US); Sudhir Bhojwani, Fremont, CA (US); Payod Deshpande, Palo Alto, CA (US); Pranay Kaikini, Palo Alto, CA (US); Raghavendra Keshavamurthy, Palo Alto, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,648

(22) Filed: Sep. 17, 2021

(65) Prior Publication Data
US 2022/0004946 A1 Jan. 6, 2022

Related U.S. Application Data

(63) Continuation of application No. 16/457,707, filed on Jun. 28, 2019, now Pat. No. 11,151,484, which is a
(Continued)

(51) Int. Cl.
*G06Q 30/06* (2012.01)
*G06F 40/174* (2020.01)
(Continued)

(52) U.S. Cl.
CPC ....... *G06Q 10/0631* (2013.01); *G06F 3/0482* (2013.01); *G06F 40/174* (2020.01);
(Continued)

(58) Field of Classification Search
CPC ............................ G06F 3/0482; G06F 40/174
See application file for complete search history.

(56) References Cited

U.S. PATENT DOCUMENTS

| | | | | |
|---|---|---|---|---|
| 6,134,557 A | * | 10/2000 | Freeman | G06Q 30/06 |
| | | | | 707/999.102 |
| 6,950,826 B1 | * | 9/2005 | Freeman | G06Q 10/087 |
| | | | | 705/28 |

(Continued)

*Primary Examiner* — Benjamin Smith
(74) *Attorney, Agent, or Firm* — Fountainhead Law Group P.C.

(57) ABSTRACT

In response to a request received from a client device to view an item, a program determines a category associated with the item and a location associated with a user of the client device. The program also identifies a form based on the category and the location. The form comprises a set of fields. The program then provides a graphical user interface (GUI) that includes the form to the client device. The program also receives, through the GUI, data values for the set of fields from the client device and a request to add the item to a collection of items. The program then identifies a policy based on the category and the location. The program also applies the policy to the data values for the set of fields. The program then sends a notification to the client device indicating a result of the application of the policy.

20 Claims, 15 Drawing Sheets

Related U.S. Application Data continuation of application No. 15/256,332, filed on Sep. 2, 2016, now Pat. No. 10,380,513.

(60) Provisional application No. 62/307,358, filed on Mar. 11, 2016.

(51) Int. Cl.
*G06F 3/0482* (2013.01)
*G06Q 10/06* (2012.01)
*G06Q 10/0631* (2023.01)
*G06Q 30/0601* (2023.01)
*G06Q 50/28* (2012.01)

(52) U.S. Cl.
CPC ......... *G06Q 30/06* (2013.01); *G06Q 30/0601* (2013.01); *G06Q 30/0611* (2013.01); *G06Q 30/0643* (2013.01); *G06Q 50/28* (2013.01)

(56) References Cited

U.S. PATENT DOCUMENTS

| | | | | |
|---|---|---|---|---|
| 7,505,968 B2* | 3/2009 | Beres | ............. | G06F 16/334 |
| | | | | 707/999.005 |
| 7,791,474 B2* | 9/2010 | Saito | ............. | G06F 40/186 |
| | | | | 455/404.1 |
| 8,548,868 B1* | 10/2013 | Lawrence | ............. | G06Q 30/0605 |
| | | | | 705/26.4 |
| 8,694,429 B1* | 4/2014 | Ballaro | ............. | G06Q 30/0635 |
| | | | | 705/40 |
| 8,756,117 B1* | 6/2014 | Ballaro | ............. | G06Q 30/0633 |
| | | | | 705/26.1 |
| 9,152,934 B2* | 10/2015 | Carlson | ............. | G06Q 30/00 |
| 9,652,562 B2* | 5/2017 | Barrus | ............. | G06F 17/40 |
| 10,089,292 B2* | 10/2018 | Shetty | ............. | G06F 40/174 |
| 10,311,374 B2* | 6/2019 | Shetty | ............. | G06F 16/93 |
| 10,380,512 B2* | 8/2019 | Tung | ............. | G06Q 30/0601 |
| 10,380,513 B2* | 8/2019 | Tung | ............. | G06F 40/174 |
| 11,151,484 B2* | 10/2021 | Tung | ............. | G06F 3/0482 |
| 2005/0209987 A1* | 9/2005 | Beres | ............. | G06F 16/907 |
| 2006/0068904 A1* | 3/2006 | Nguyen | ............. | G06Q 40/02 |
| | | | | 463/29 |
| 2006/0190391 A1* | 8/2006 | Cullen, III | ............. | G06Q 10/10 |
| | | | | 705/37 |
| 2008/0015944 A1* | 1/2008 | Nose | ............. | G06Q 30/0601 |
| | | | | 705/26.1 |
| 2008/0204226 A1* | 8/2008 | Saito | ............. | G06F 40/174 |
| | | | | 382/190 |
| 2008/0300959 A1* | 12/2008 | Sinha | ............. | G06Q 10/10 |
| | | | | 705/7.29 |
| 2009/0228339 A1* | 9/2009 | Wolf | ............. | G06Q 30/08 |
| | | | | 705/26.1 |
| 2011/0035655 A1* | 2/2011 | Heineken | ............. | G06F 40/174 |
| | | | | 715/223 |
| 2011/0047162 A1* | 2/2011 | Brindisi | ............. | G06Q 30/0641 |
| | | | | 707/E17.09 |
| 2011/0145739 A1* | 6/2011 | Berger | ............. | G06F 40/174 |
| | | | | 715/763 |
| 2012/0101869 A1* | 4/2012 | Manganelli | ............. | G06Q 30/0283 |
| | | | | 705/400 |
| 2013/0117652 A1* | 5/2013 | Folsom | ............. | G06F 40/174 |
| | | | | 715/222 |
| 2013/0132430 A1* | 5/2013 | Platt | ............. | G09B 29/007 |
| | | | | 707/770 |
| 2013/0132440 A1* | 5/2013 | Carlson | ............. | H04L 67/306 |
| | | | | 707/792 |
| 2013/0205189 A1* | 8/2013 | DiPierro | ............. | G06F 40/174 |
| | | | | 715/224 |
| 2014/0100982 A1* | 4/2014 | Sharma | ............. | G06Q 30/0605 |
| | | | | 705/26.2 |
| 2014/0180863 A1* | 6/2014 | Ganesan | ............. | G06Q 30/0611 |
| | | | | 705/26.4 |
| 2014/0256261 A1* | 9/2014 | Barrus | ............. | H04B 7/24 |
| | | | | 455/41.2 |
| 2014/0316841 A1* | 10/2014 | Kilby | ............. | G06F 16/5866 |
| | | | | 705/7.26 |
| 2014/0316927 A1* | 10/2014 | Ganesan | ............. | G06Q 30/0611 |
| | | | | 705/26.4 |
| 2014/0358723 A1* | 12/2014 | Ballaro | ............. | G06Q 30/0633 |
| | | | | 705/26.8 |
| 2014/0365348 A1* | 12/2014 | Ballaro | ............. | G06Q 30/0633 |
| | | | | 705/30 |
| 2015/0248391 A1* | 9/2015 | Watanabe | ............. | G06F 16/9554 |
| | | | | 715/226 |
| 2015/0262094 A1* | 9/2015 | Kozloski | ............. | G06Q 10/0637 |
| | | | | 705/7.27 |
| 2015/0348148 A1* | 12/2015 | Sharma | ............. | G06Q 30/0631 |
| | | | | 705/26.2 |
| 2016/0155069 A1* | 6/2016 | Hoover | ............. | G06Q 30/06 |
| | | | | 706/12 |
| 2017/0052536 A1* | 2/2017 | Warner | ............. | G06Q 10/06312 |
| 2017/0075873 A1* | 3/2017 | Shetty | ............. | G06F 40/174 |
| 2017/0075974 A1* | 3/2017 | Shetty | ............. | G06F 40/174 |
| 2017/0076327 A1* | 3/2017 | Filippini | ............. | G06F 16/954 |
| 2017/0147572 A1* | 5/2017 | Kilby | ............. | G06Q 10/06316 |
| 2017/0262422 A1* | 9/2017 | Tung | ............. | G06F 3/0482 |
| 2017/0262776 A1* | 9/2017 | Tung | ............. | G06Q 30/0601 |
| 2019/0325361 A1* | 10/2019 | Tung | ............. | G06Q 30/0601 |
| 2022/0004946 A1* | 1/2022 | Tung | ............. | G06F 40/174 |

* cited by examiner

600

Room redesign
All room redesign and carpeting services are managed by the Global Facility Management (GFM) team. Customize the room redesign here for GFM.

605 — Basic info for your request

| Title 610 | Request on behalf of 612 |
|---|---|
| New Facility Request | Myself |

Need by date 614
3/25/2016

More about your request

| Service 616 | Location 618 |
|---|---|
| Conference room redesign | Palo Alto |
| Building 620 | Room 622 |
| MR PAL02 | All rooms |
| Square footage of room 624 | Time of work 626 |
| 250 | After-hours |
| Estimated Value 628 | Respond in 630 |
| $5k-$10k | 1 week |

Attachment
Add an attachment  635

Suppliers   Supplier category: Interior design   Supplier location: Northern California

| Supplier | Services | Ratings | Action |
|---|---|---|---|
| Biancas Design Co. [Preferred]  Sunnyvale, CA | Flooring, furniture, and interior redesign | ★★★★★ (75) | Selected  Cancel |
| Unicorn Design Company  Santa Clara, CA | Flooring, furniture, and interior redesign | ★★★★ (48) | Selected  Cancel |
| abc  Northern California | Flooring, furniture, and interior redesign | (0) | Selected  Cancel |

See more suppliers    Invite new supplier

Process
These steps are based on the options you choose on this page.

Request — Quotes — Budget approval — Category manager review — Order

640 Save as draft    Request quotes 645

FIG. 6

| Location | Category | Type | Rule |
|---|---|---|---|
| 010102 | 010101 | Shopping | Rule 1 |
| 0101 | 0102 | RFQ | Rule 2 |
| 010102 | 0101 | Shopping | Rule 3 |
| 0101 | 0101 | Shopping | Rule 4 |
| 0102 | 0101 | RFQ | Rule 5 |
| 01 | 0101 | Requisition | Rule 6 |

FRAMEWORK FOR CLASSIFYING FORMS AND PROCESSING FORM DATA

CROSS-REFERENCE TO RELATED APPLICATION

This application is a continuation of U.S. patent application Ser. No. 16/457,707, filed Jun. 28, 2019. U.S. patent application Ser. No. 16/457,707 is a continuation of U.S. patent application Ser. No. 15/256,332, filed Sep. 2, 2016. The entire contents of U.S. patent application Ser. No. 15/256,332 and Ser. No. 16/457,707 are incorporated herein by reference in its entirety for all purposes. U.S. patent application Ser. No. 15/256,332 claims the benefit and priority of U.S. Provisional Application No. 62/307,358, filed Mar. 11, 2016, entitled "Guided Buying," the entire contents of which are incorporated herein by reference in its entirety for all purposes.

BACKGROUND

Today, enterprises have different processes in place for procuring different goods and services. Many enterprises have a number of different systems for handling different stages of procurement processes. Different departments or employees may be responsible for handling the different stages of the procurement processes. In addition, each stage may require a user to manually make selections, enter information into the system, etc. As such, procurement processes are often tedious and cumbersome processes that require users to use separate and disjointed systems in order to complete the procurement processes.

Enterprises will typically have a variety of policies in place for the items that may be procured and the manner in which the items are procured. Often times, employees wanting to procure items in an enterprise environment are not aware of and/or cannot find information on policies that are applicable to the items. As a result, employees may attempt to procure items that they are not allowed to procure or the employees perform incorrect actions at various stages of the procurement processes, which leads to inefficient use and/or waste of time.

SUMMARY

In some embodiments, a non-transitory computer-readable medium stores a programs executable by at least one processing unit. In response to a request received from a client device to view an item, the program determines a category associated with the item and a location associated with a user of the client device. The program also identifies a form based on the category and the location. The form comprises a set of fields. The program then provides a graphical user interface (GUI) that includes the form to the client device. The program also receives, through the GUI, data values for the set of fields from the client device and a request to add the item to a collection of items. The program then identifies a policy based on the category and the location. The program also applies the policy to the data values for the set of fields. The program then sends a notification to the client device indicating a result of the application of the policy.

In some embodiments, the policy is a first policy. The program further receives a request for the item and requisition information associated with the item. In response to the request, the program then identifies a second policy based on the category and the location. The program also applies the second policy to the requisition information.

In some embodiments, the program determines that the result of the application of the policy is a violation of the policy. The program then prevents the item from being added to the collection of items. In some embodiments, the program determines that the result of the application of the policy is a not violation of the policy. The program then adds the item to the collection of items.

In some embodiments, the item is a first item, the category is a first category, and the form is a first form comprising a first set of fields. In response to a request received from a client device to view a second item, the program further determines a second, different category associated with the second item. The program also identifies a second, different form based on the second category and the location. The second form comprises a second, different set of fields. The program also provides the GUI that includes the second form to the client device.

In some embodiments, in response to a request received from a client device to view an item, a method determines a category associated with the item and a location associated with a user of the client device. The method also identifies a form based on the category and the location. The form comprises a set of fields. The method then provides a graphical user interface (GUI) that includes the form to the client device. The method also receives, through the GUI, data values for the set of fields from the client device and a request to add the item to a collection of items. The method then identifies a policy based on the category and the location. The method also applies the policy to the data values for the set of fields. The method then sends a notification to the client device indicating a result of the application of the policy.

In some embodiments, the method further receives a request for the item and requisition information associated with the item. In response to the request, the method may identify a second policy based on the category and the location. The method then applies the second policy to the requisition information.

In some embodiments, the method further determines that the result of the application of the policy is a violation of the policy. The method also prevents the item from being added to the collection of items. In some embodiments, the method of further determines that the result of the application of the policy is a not violation of the policy. The method then adds the item to the collection of items.

In some embodiments, the item is a first item, the category is a first category, and the form is a first form comprising a first set of fields. In response to a request received from a client device to view a second item, the method further determines a second, different category associated with the second item. The method then identifies a second, different form based on the second category and the location. The second form comprises a second, different set of fields. The method also provides the GUI that includes the second form to the client device.

In some embodiments, a system includes a set of processing units and a non-transitory computer-readable medium that stores instructions. In response to a request received from a client device to view an item, the instructions cause at least one processing unit to determine a category associated with the item and a location associated with a user of the client device. The instructions also cause the at least one processing unit to identify a form based on the category and the location. The form comprises a set of fields. The instructions then cause the at least one processing unit to provide a graphical user interface (GUI) that includes the form to the client device. The instructions also cause the at least one processing unit to receive, through the GUI, data values for the set of fields from the client device and a request to add the item to a collection of items. The instructions then cause the at least one processing unit to identify a policy based on the category and the location. The instructions also cause the at least one processing unit to apply the policy to the data values for the set of fields. The instructions then cause the at least one processing unit to send a notification to the client device indicating a result of the application of the policy.

In some embodiments, the instructions further cause the at least one processing unit to receive a request for the item and requisition information associated with the item. In response to the request, the instructions cause the at least one processing unit to identify a second policy based on the category and the location. The instructions also cause the at least one processing unit to apply the second policy to the requisition information.

In some embodiments, the instructions further cause the at least one processing unit to determine that the result of the application of the policy is a violation of the policy. The instructions also cause the at least one processing unit to prevent the item from being added to the collection of items. In some embodiments, the instructions further cause the at least one processing unit to determine that the result of the application of the policy is a not violation of the policy. The instructions then cause the at least one processing unit to add the item to the collection of items.

In some embodiments, the item is a first item, the category is a first category, and the form is a first form comprising a first set of fields. In response to a request received from a client device to view a second item, the instructions cause the at least one processing unit to determine a second, different category associated with the second item. The instructions also cause the at least one processing unit to identify a second, different form based on the second category and the location, the second form comprising a second, different set of fields. The instructions then cause the at least one processing unit to provide the GUI that includes the second form to the client device.

The following detailed description and accompanying drawings provide a better understanding of the nature and advantages of the present invention.

BRIEF DESCRIPTION OF THE DRAWINGS

FIG. 6 illustrates another example of a page that includes a form for procuring an item according to some embodiments.

FIG. 12 illustrates example policies that are defined according to the hierarchies illustrated in FIGS. 10 and 11.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for procuring items (e.g., goods and/or services) from a variety of suppliers in a seamless and automated manner. In some embodiments, a system is provided that implements such techniques. Policies may be defined for the system, which applies the policies to items requested to be procured. This way, the system may control what items may be procured and the manner in which the items are procured. Additionally, different types of policies may be defined for the system, which applies the different types of policies at different stages of procurement processes.

Figure 1:
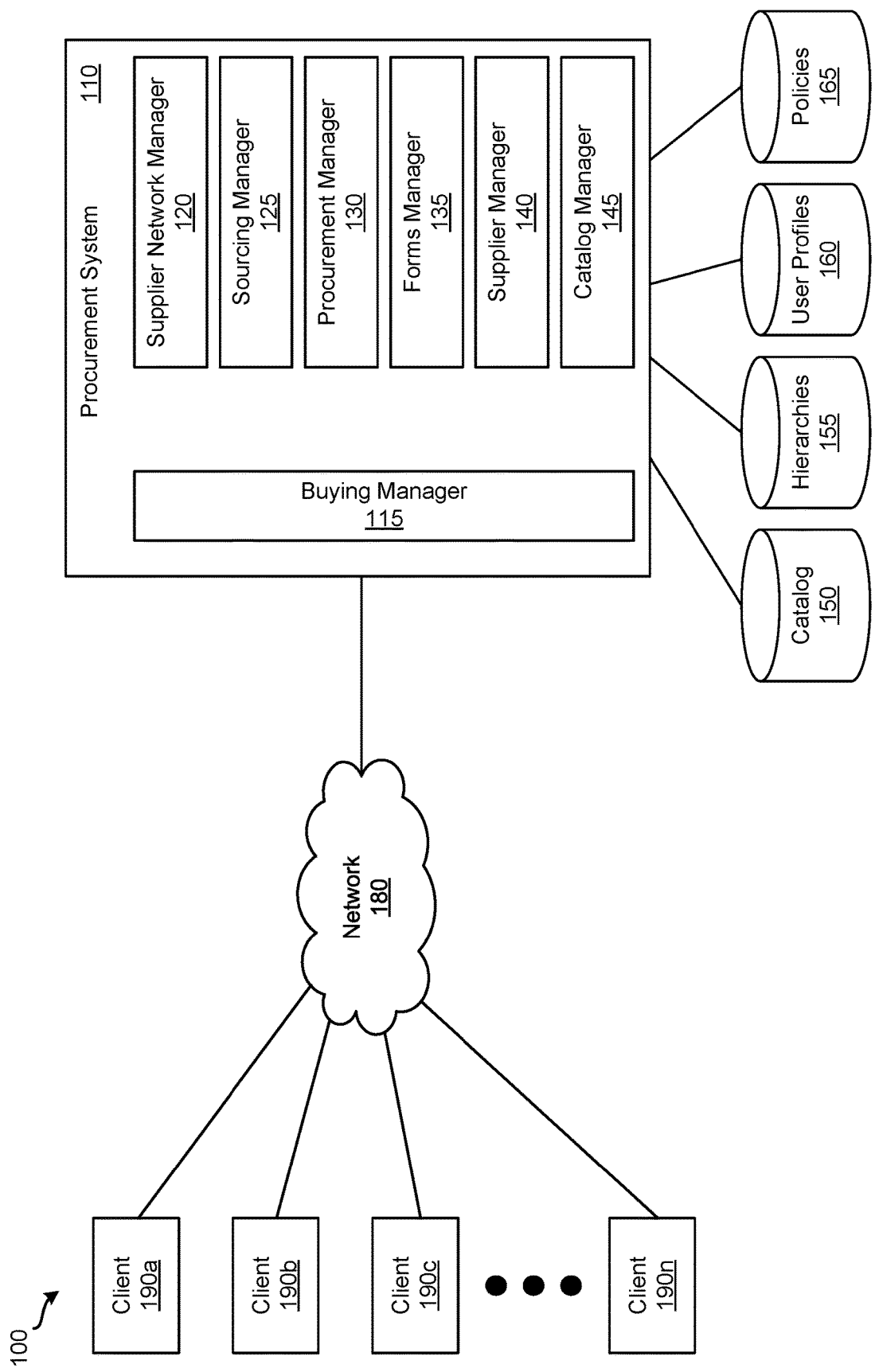
FIG. 1 illustrates an architecture of a procurement system according to some embodiments.

FIG. 1 illustrates an architecture of such a system 100 according to some embodiments. As shown, system 100 includes procurement system 110, network 180, client devices 190a-n, and storages 150-165. Network 180 may be any type of network configured to facilitate data communications among client devices 190a-n and procurement system 110 using any of a variety of network protocols. Network 180 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

Client devices 190a-n are configured to access and communicate with procurement system 110 via network 180. For instance, a user (e.g., an employee, a buyer, etc.) may use a client device 190 to send a request to procure an item to procurement system 110. As another example, a user (e.g., a supplier) may use a client device 190 to access requests for quotes (RFQs) that the user has received from another user (e.g., an employee, a buyer, etc.).

As illustrated in FIG. 1, procurement system 110 includes buying manager 115, supplier network manager 120, sourcing manager 125, procurement manager 130, forms manager 135, supplier manager 140, catalog manager 145, catalog storage 150, hierarchies storage 155, user profiles storage 160, and policies storage 165.

Buying manager 115 serves as an interface through which buyers (e.g., via client devices 190a-n) communicate with procurement system 110. Buying manager 115 provides to client devices 190a-n various graphical user interfaces (GUIs) for client devices 190a-n to interact with procurement system 110. For example, buying manager 115 may provide GUIs for creating and managing policies and GUIs for viewing items to procure. Buying manager 115 is also responsible for managing policies for procuring an item. For instance, buying manager 115 creates policies (which are stored in policies storage 165), identifies policies associated with an item requested to be procured, and applies policies at various stages of procuring the item.

Supplier network manager 120 is configured to provide an interface through which suppliers (e.g., via client devices 190a-n) manage items that suppliers are selling, RFQs for items, purchases of items received from buyers, invoices for purchased items, etc. Sourcing manager 125 handles many of the RFQ operations (among other functions related to the sourcing of items) for procurement system 110. For example, sourcing manager 125 may manage RFQ process templates. In some embodiments, an RFQ process template is associated with a particular item and specifies information (e.g., price, availability, etc.) to request from a supplier in an RFQ of the item. As another example, sourcing manager 125 may receive requests to generate RFQs for a set of specified suppliers and, in response, generate RFQs for the specified suppliers.

Procurement manager 130 handles the requisition operations associated with the procurement of items. Procurement manager 130 is also responsible for approval operations associated with the procurement of items. For example, in some instances, a user (e.g., an employee) may request an item to be procured that requires approval from another user (e.g., a manager). In such instances, procurement manager 130 receives a request from buying manager 115 to handle the approval of the item and, in response, sends a request for approval to the other user. Once procurement manager 130 receives a response from the other user, procurement manager 130 forwards the response to buying manager 115.

Forms manager 135 stores and manages forms that are used for procuring items. In some embodiments, a form includes a set of fields and is associated with a location, a category, and/or an item. The forms may be used to prompt a user for input (e.g., data values) for one or more fields in the set of fields. Procuring different category of items may require different information, different forms may be defined for different category of items. For instance, procuring a contractor may require information such as employment history, years of experience, education, etc., while procuring database storing may require information such as amount of storage space, type of storage, etc. Forms manager 135 may store metadata associated with each of the forms. For instance, forms manager 135 may store, for each form, descriptions of each field specified in the form.

Supplier manager 140 is configured to identify suppliers from which to procure items. In some embodiments, supplier manager 140 identifies suppliers based on a location and the category to which the item that is to be procured belongs. A supplier may be specified as a preferred supplier or a non-preferred supplier. As such, for a particular location and category of an item, supplier manager 140 may identifier a set of suppliers that includes preferred suppliers and/or non-preferred suppliers.

Catalog manager 145 is responsible for managing a catalog of items in catalog storage 150. In some embodiments, an item may be defined as a good, a service, or a combination of one or more goods and one or more services. For instance, an item may be defined as a machine and a service to install the machine. Upon request, catalog manager 145 retrieves items (e.g., a specific item, items associated with a particular category, etc.) stored in catalog storage 150

Storages 150-165 are configured to store a variety of different data for procurement system 110. Specifically, Catalog storage 150 is configured to store a plurality of items that may be procured from suppliers. In some embodiments, catalog storage 150 stores, for each item, a category associated with the item, a description of the item, a supplier of the item, a price of the item, whether the item requires RFQs, etc. Hierarchies storage 155 stores hierarchies that are used by the buying manager 115. For instance, hierarchies storage 155 may store a hierarchy of locations and a hierarchy of categories. Examples of such hierarchies will be described below by reference to FIGS. 10 and 11. User profiles storage 160 is configured to store information associated with users of procurement system 110. In some embodiments, user profiles storage 160 stores, each user of procurement system 110, a location associated with the user, a role of the user (e.g., an employee, a manager, etc.), among other information associated with the user.

Policies storage 165 stores policies that are used during various stages of procuring an item. In some embodiments, a policy specifies a type, a location, a category, and a rule. In some such embodiments, the type of a policy may be specified as one of several types: a shopping policy, an RFQ policy, or a requisition policy. Shopping policies may be applied during the viewing and selection stages of procuring items. RFQ policies may be applied during the RFQ stage of procuring items. Requisition policies may be applied during the requisition stage of procuring items. In some embodiments, the rule of a policy may specify a set of conditions that are applied to input data (e.g., data values of one or more fields in a form, data associated with a user, data associated with an item, requisition data, etc.) and a set of operations that are performed if the set of conditions are satisfied. A set of conditions of a rule of a policy may specify that a user may provide data values of one or more fields in a form. Alternatively, a set of conditions of a rule of a policy may specify that a user may provide data values of one or more fields in a form, but a different must approve the data values of one or more fields in the form. Examples of operations that may be specified for a rule of a policy include sending a notification (also referred to as a warning rule), sending a notification and requesting for additional info (also referred to as a soft stop rule), and/or denying a request to procure an item (also referred to as a hard stop rule).

Storages 150-165 may be implemented as separate physical storages, as a single physical storage, or as a combination thereof. In addition, storages 150-165 may be implemented using any number of different storage technologies (e.g., databases, file systems, distribute data stores, etc.). While FIG. 1 shows storages 150-165 as external to procurement system 110, in some embodiments, some or all of storages 150-165 may be included in procurement system 110.

Figure 2:
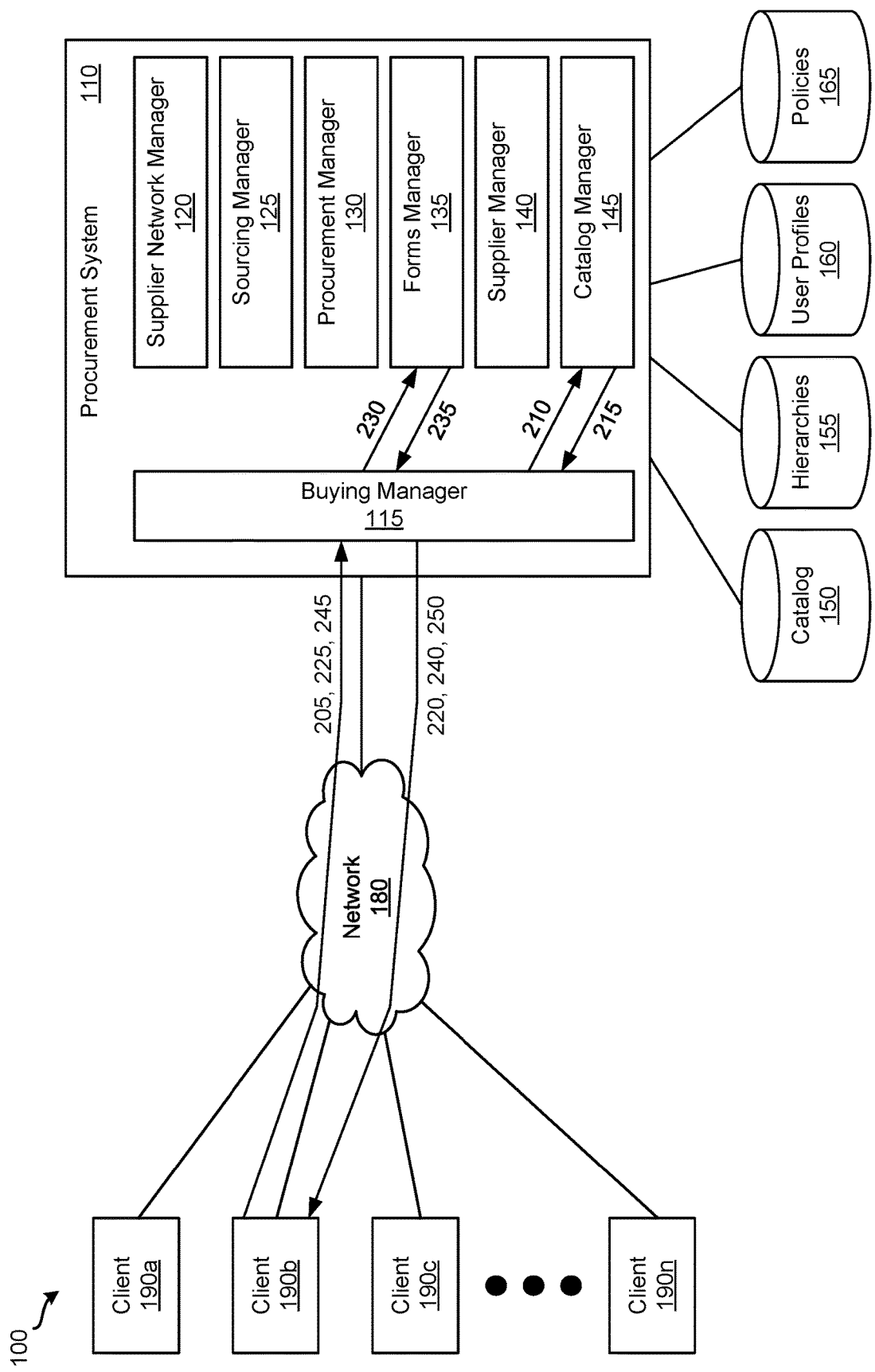
FIG. 2 illustrates an example data flow through the system illustrated in FIG. 1 according to some embodiments.

FIG. 2 illustrates an example data flow through the system illustrated in FIG. 1 according to some embodiments. Specifically, FIG. 2 illustrates a data flow of a user using procurement system 110 to view and select an item for procurement according some embodiments. The data flow starts by a user (e.g., a buyer) sending, at operation 205, a request for a category page that includes items associated with the category to buying manager 115. As shown, the user is sending the request from client device 190b. The request may be sent through a GUI presented on client device 190b that allows the user to select a category or input text (e.g., keywords) to search for a category.

Figure 3:
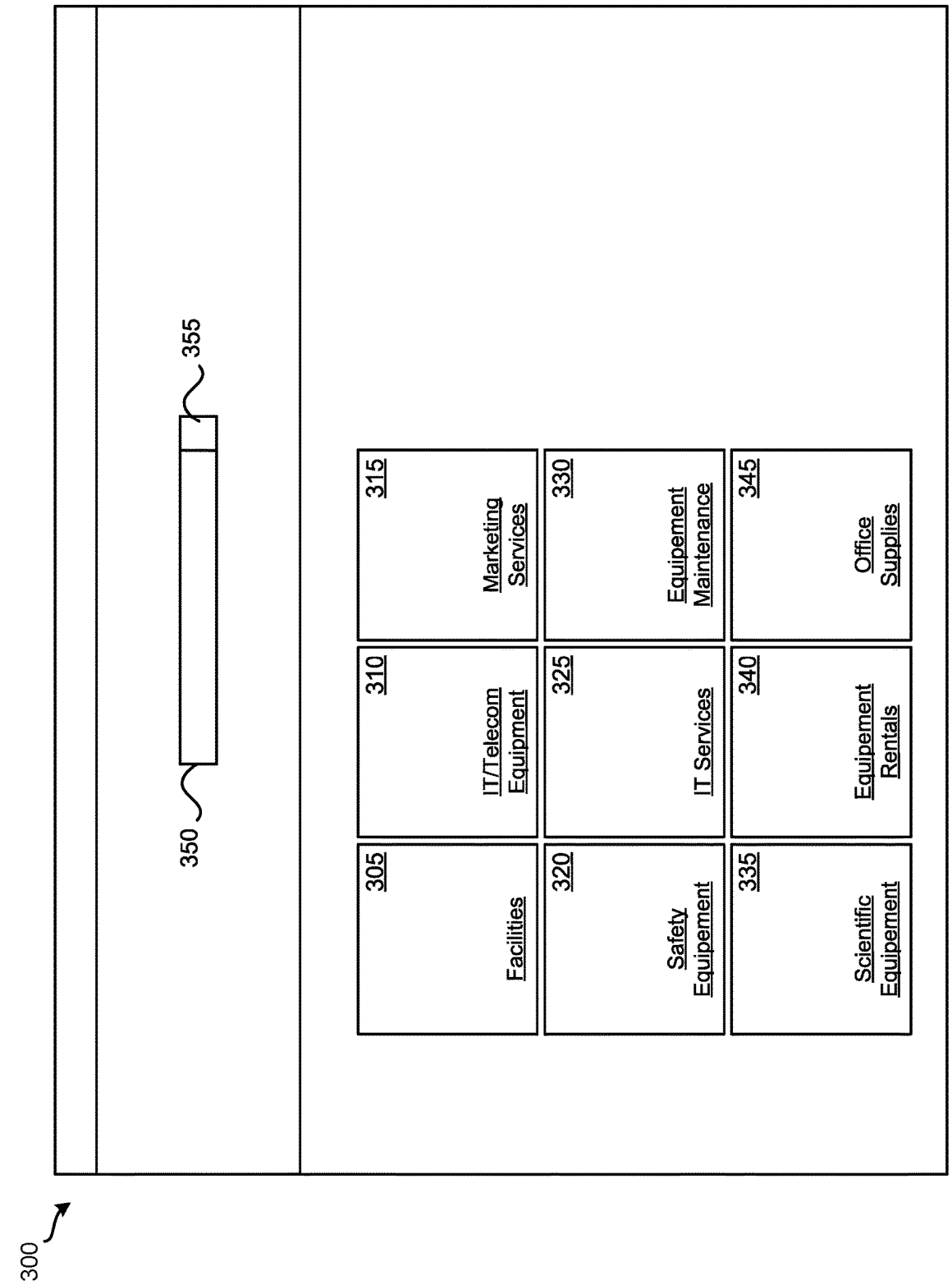
FIG. 3 illustrates a graphical user interface (GUI) for selecting or searching for a category according to some embodiments.

FIG. 3 illustrates an example of such a GUI. In particular, FIG. 3 illustrates GUI 300, which includes selectable UI items 305-345 and UI control 350. Selectable UI items 305-345 each represents a different category, upon selection, causes GUI 300 to navigate to a page of items associated with the corresponding category. UI control 350 is configured to receive text input and includes selectable item 355 that, when selected, causes GUI 300 to perform a search for a set of category pages based on the text input. For this example, the user selects selectable UI item 310, which represents an IT/telecom equipment category.

Returning to FIG. 2, upon receiving the request from client device 190b, buying manager 115 instructs, at operation 210, catalog manager 145 to identify items in catalog storage 150 that are associated with the selected category. In response, catalog manager 145 returns, at operation 215, the requested items to buying manager 115. Buying manager 115 then generates a page that includes the identified items and sends, at operation 220, the page to client device 190b for client device 190b to present on a display of client device 190b. Next, the user may select to view an item in the page presented on client device 190b. Upon receiving the selection from the user, client device 190b sends, at operation 225, a request to view the selected item to buying manager 115.

In response to the request, buying manager 115 identifies, by accessing user profiles storage 160, a location associated with the user and identifies, by accessing catalog storage 150, a category associated with the item requested for viewing. Next, buying manager 115 sends, at operation 230, to forms manager 135 the location, category, and item as well as a request for a form. Forms manager 135 identifies a form based on the location, category, and/or item and sends, at operation 235, the form to buying manager 115. Once receiving the form, buying manager 115 generates a page that includes the form and sends, at operation 240, the generated page to client device 190b for client device 190b to present on the display of client device 190b.

Figure 4A:
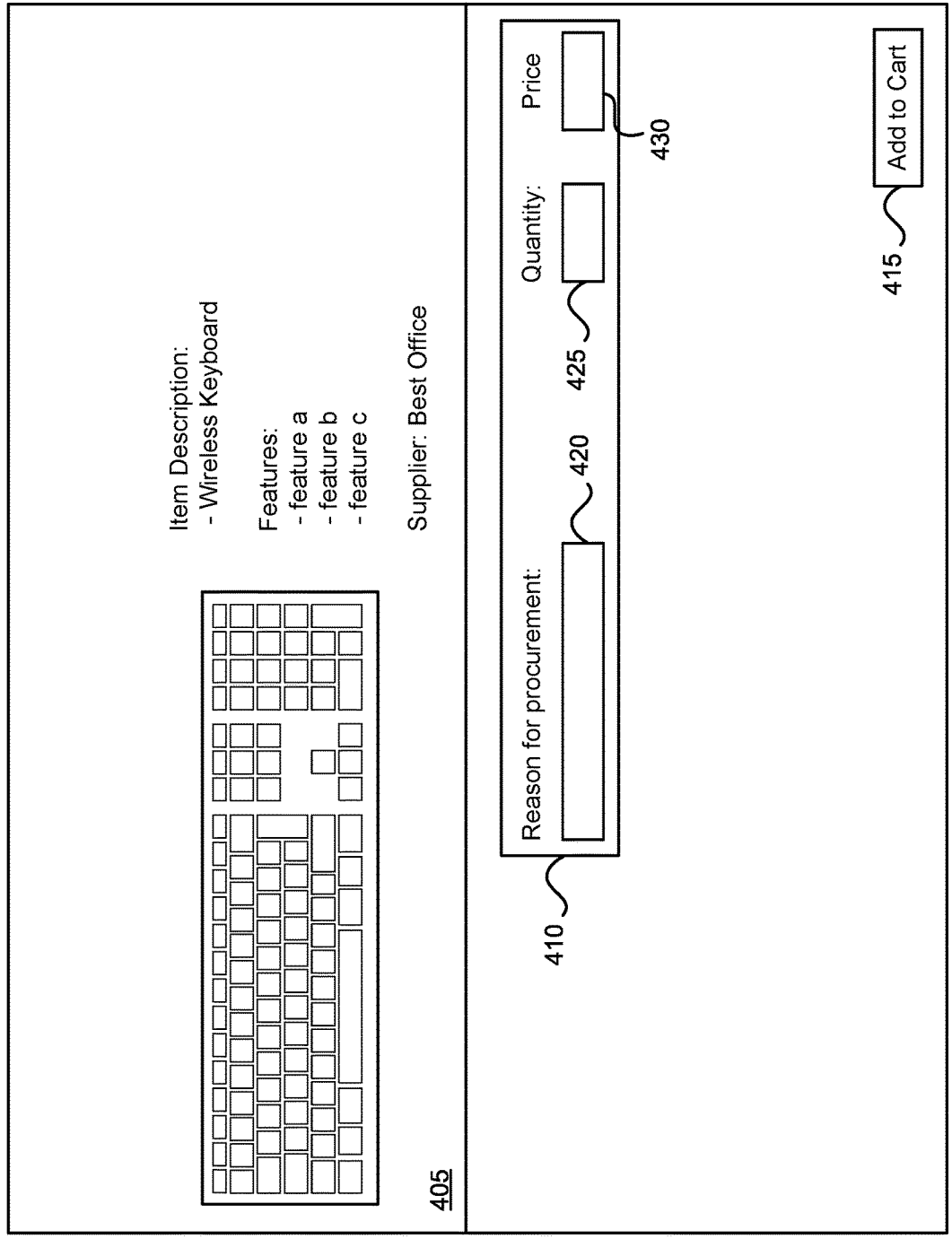
FIGS. 4A and 4B illustrate an example of a page that includes a form for procuring an item according to some embodiments.

FIG. 4A illustrates an example of a page that includes a form for procuring an item according to some embodiments. Specifically, FIG. 4A illustrates a GUI 400 for procuring a good, which in this example is a wireless keyboard. GUI 400 includes display area 405, form 410, and selectable UI item 415. Display area 405 is for displaying information about the item (an image of the item and a text description of the item in this example). Form 410 includes UI controls 420-430. UI controls 420 and 425 are configured to receive text input for a "reason for procurement" field and a "quantity" field, respectively. UI control 430 is configured to automatically calculate and display a value for a "price" field based on the value provided for the "quantity" field. UI item 415 is configured to send a request to procure the item upon selection of UI item 415.

Returning to FIG. 2, the user may provide input for the fields of the form and then send, at operation 245, buying manager 115 a request to add the item to a collection of items to procure (e.g., a shopping cart). Upon receiving the request, buying manager 115 accesses policies storage 165 to identify a set of shopping policies based on the location associated with the user and the category associated with the item. Buying manager 115 applies the identified shopping policies to the values of the fields of the form. If a shopping policy is violated, buying manager 115 performs operations (e.g., send the user a notification, prevent the item from being added to the collection of items to procure, prompt the user for additional information, etc.) specified in the rule of the shopping policy and sends, at operation 250, client device 190b a notification indicating that a violation of the policy has occurred. If no shopping policies are violated, buying manager 115 adds the item to the collection of items to procure and sends, at operation 250, client device 190b a notification that the item has been successfully added to the collection of items to procure.

Figure 4B:
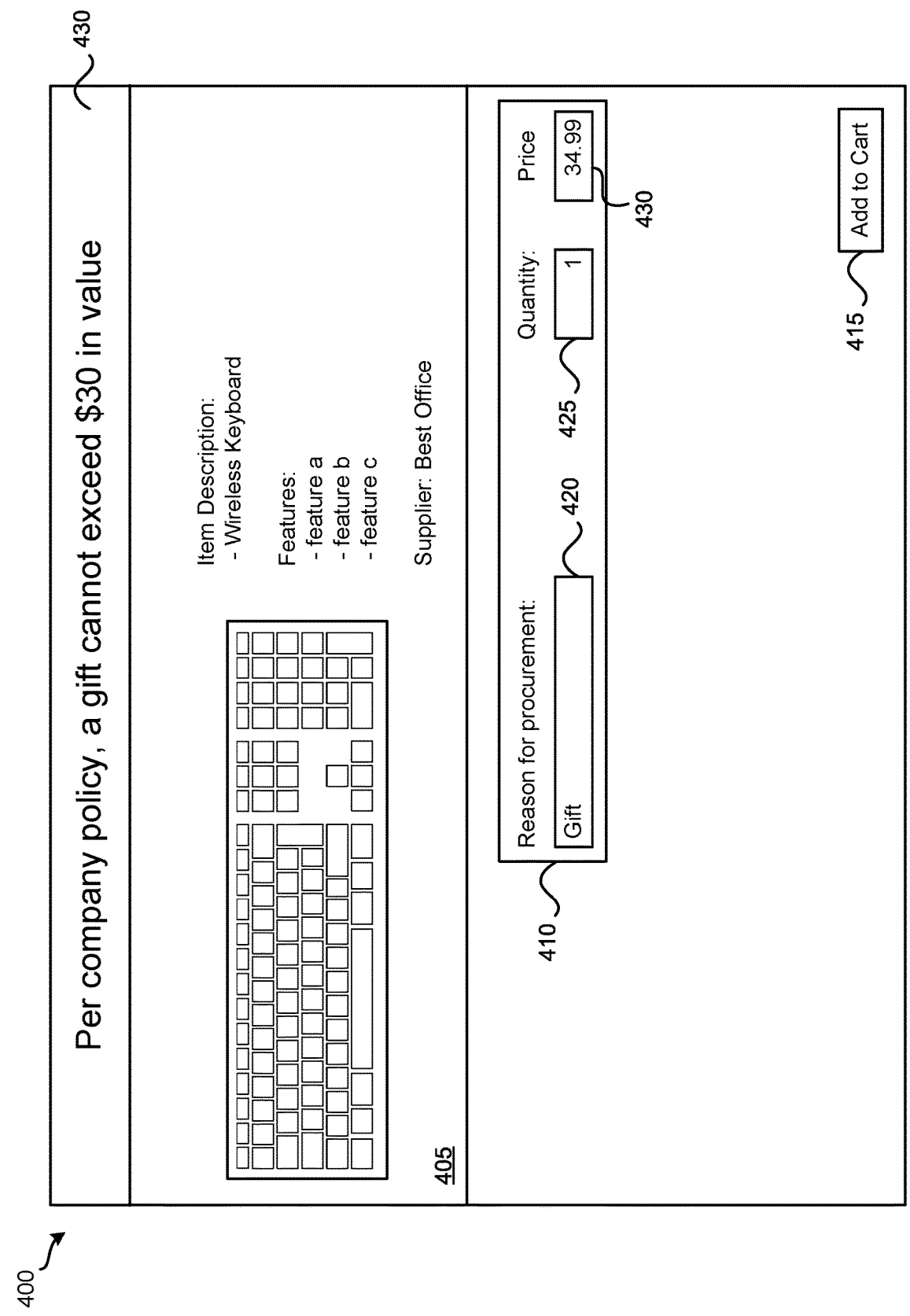

FIG. 4B illustrates GUI 400 after a user has provided input for the form according to some embodiments. As shown, a user has provided text input for UI controls 420 and 425 of form 410. For this example, the user has entered "gift" in UI control 420 and "1" in UI control 425. FIG. 4B also illustrates GUI 400 after the user has selected UI item 415 to send a request to procure the item. Upon receiving the request from the user via client device 190b, buying manager 115 identifies a policy (based on the location associated with the user and the category associated with the item) that prevents users from procuring goods valued over $30 as gifts. Buying manager 115 then applies the policy to the values provided in form 405. Since the price of the wireless keyboard is over $30 in this example, buying manager 115 prevents the user from procuring the item and sends a notification 430 to client device 190b via GUI 400 indicating that the item may not be procured.

Figure 5:
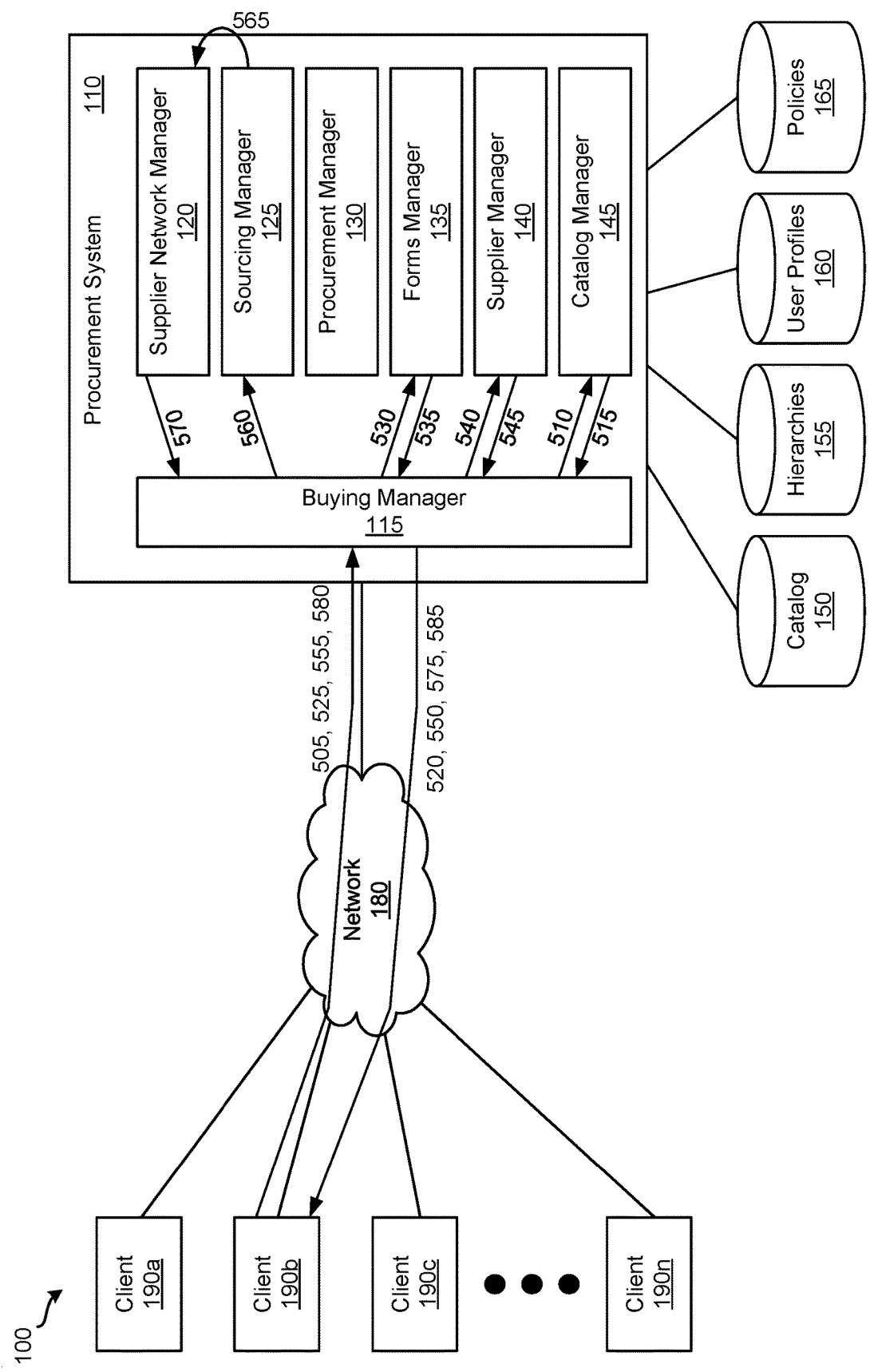
FIG. 5 illustrates another example data flow through the system illustrated in FIG. 1 according to some embodiments.

FIG. 5 illustrates another example data flow through the system illustrated in FIG. 1 according to some embodiments. Specifically, FIG. 5 illustrates a data flow of a user using procurement system 110 to view and select an item for procurement that requires RFQs according some embodiments. Operations 505-535 are the same as operations 205-235 described above for the data flow illustrated in FIG. 2. Continuing after operation 535, once buying manager 115 receives the form from forms manager 135, buying manager 115 determines, by accessing catalog storage 150 to look up information associated with the item, that the requested item requires RFQs. In response to the determination, buying manager 115 sends, at operation 540, supplier manager 140 the item (or a reference to the item such as an identifier that represents the item) and a request for a set of suppliers of the item. In response to the request, supplier manager 140 identifies a set of suppliers based on the item and returns, at operation 545, the set of suppliers to buying manager 115. Buying manager 115 then generates a page that includes the form as well as the set of suppliers and sends, at operation 550, the generated page to client device 190b for client device 190b to present on the display of client device 190b. The user may provide input (e.g., data values) for the fields of the form and select one or more suppliers from the set of suppliers.

FIG. 6 illustrates another example of a page that includes a form for procuring an item according to some embodiments. Specifically, FIG. 6 illustrates a GUI 600 that includes form 605 for procuring a service to redesign for a conference room. As shown form 605 includes UI controls 610-630 and selectable UI items 635-645. UI controls 610-630 are configured to receive text input for a variety of fields (e.g., title, request on behalf of, need by date, service, location, building, room, etc.). Selectable UI item 635 is configured to invoke, upon selection, a feature for adding an attachment to form 605. Selectable UI item 640 is configured to save, upon selection a draft of the procurement request (e.g., the data values provided for the fields in form 605 and/or selections of suppliers). Selectable UI item 645 is configured to send, upon selection, buying manager 115 a request to send RFQs to the selected suppliers. As shown in FIG. 6, in this example, the user has already provided text input for UI controls 610-630 of form 605 and selected three suppliers (one preferred supplier and two non-preferred suppliers) from which RFQs are to be requested.

Returning to FIG. 5, the user may send, at operation 555, buying manager 115 a request to send RFQs for the item to the selected suppliers. Upon receiving the request, buying manager 115 accesses policies storage 165 to identify a set of RFQ policies based on the location associated with the user and the category associated with the item. Buying manager 115 applies the identified RFQ policies to the values of the fields of the form. If an RFQ policy is violated, buying manager 115 performs operations (e.g., send the user a notification, prevent the user from procuring the item, prompt the user for additional information, etc.) specified in the rule of the RFQ policy. For example, buying manager 115 may send, at operation 250, client device 190b a notification indicating a violation of the policy. For instance, an RFQ policy may require that the user select a minimum number of suppliers for RFQs and buying manager 115 may send client device 190b a notification indicating so if such a policy is violated. If no RFQ policies are violated, buying manager 115 sends, at operation 560, sourcing manager 125 a request to process the RFQ requests for the selected set of suppliers.

Upon receiving the request, sourcing manager 125 determines information to request from suppliers (e.g., price, availability, etc.) in the RFQs. In some embodiments, sourcing manager 125 determines such information by identifying an RFQ process template associated with the item from the RFQ process templates managed by sourcing manager 125 and identifying the information specified in the RFQ process template. Sourcing manager 125 then generates an RFQ that requests such information for each of the selected suppliers and sends, at operation 565, the RFQs to supplier network manager 120, which sends each of the suppliers a notification indicating that the supplier has received an RFQ. Once supplier network manager 120 receives the requested information for the RFQs from the selected suppliers, supplier network manager 120 forwards, at operation 570, the information to buying manager 115. Buying manager 115 may then send, at operation 575, client device 190b the RFQ information from the suppliers for client device 190b to present on a display of client device 190b. The user may now select a supplier to use to procure the item and send, at operation 580, buying manager 115 a request to procure the item using the selected supplier. In response, buying manager 115 adds the item to a collection of items to procure (e.g., a shopping cart) and sends, at operation 585, client device 190b a notification that the item has been successfully added to the collection of items to procure.

Although FIGS. 3, 4, and 6 illustrates UI controls for receiving text input, one of ordinary skill in the art will understand that additional and/or different types of UI controls configured to receive input may be used in some embodiments. For instance, checkboxes, radio buttons, drop-down lists, etc. may be used. In addition, the example data flows described above by reference to FIGS. 2 and 5 illustrate separate examples applying a shopping policy to an item and applying an RFQ policy to an item, respectively. One of ordinary skill in the art will appreciate that one or more shopping policies and/or one or more RFQ policies may be applied to an item during the procurement process of the item in some embodiments.

FIGS. 2 and 5 illustrate examples of adding items to a collection of items to procure. In some instances, a user may request to procure the items in the collection of items. In such instances, buying manager 115 may receive from a client device (e.g., client device 190b) a request to procure items in the collection of items and requisition information. Examples of requisition information include a shipping address, accounting information, a reason for purchase, payment information, supplier information, etc.

For each item in the collection of items, buying manager 115 access policies storage 165 to identify requisition policies based on the location associated with the user and the category associated with the item. Buying manager 115 then applies the requisition policies to requisition information. If a requisition policy is violated, buying manager 115 performs operations (e.g., send the user a notification, prevent the user from procuring the item, prompt the user for additional information, etc.) specified in the rule of the requisition policy. If no requisition policies are violated, buying manager 115 sends procurement manager 130 a request to process the requisition of the items in the collection.

Figure 7:
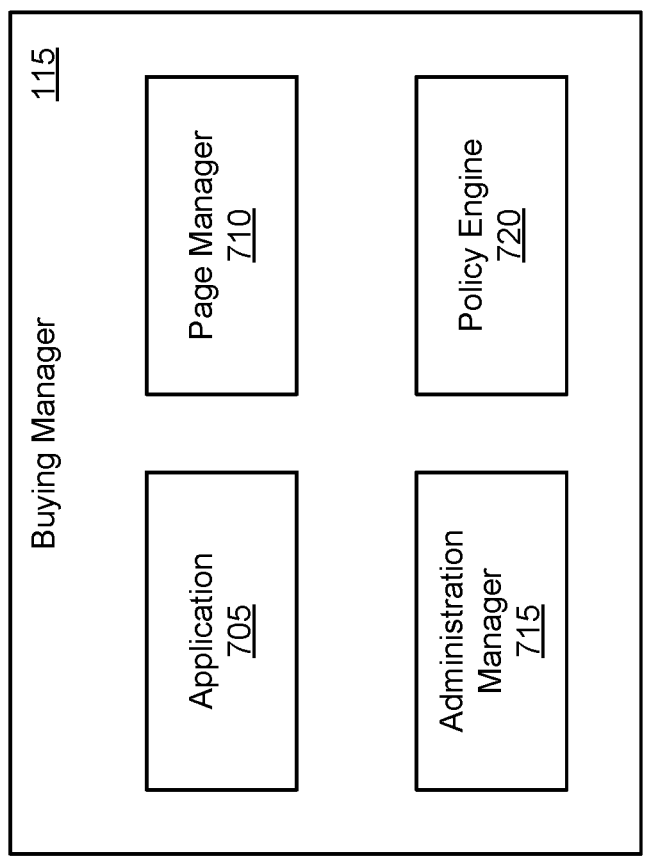
FIG. 7 illustrates an architecture of a buying manager according to some embodiments.

FIG. 7 illustrates an architecture of buying manager 115 according to some embodiments. As shown, buying manager 115 includes application 705, page manager 710, administration manager 715, and policy engine 720. Application 705 is an application through which buyers (e.g., via client devices 190a-n) access procurement system 110. In particular, application 705 provides various interfaces (e.g., GUIs such as GUI 300, 400, and 600) that allow buyers to interact with procurement system 110. Application 705 may receive pages generated by page manager 710 and provide such pages to client devices 190a-n.

Page manager 710 is configured to generate pages for application 705 to present to client devices 190a-n. For instance, when page manager 710 receives a request from application 705 to generate a page for a category of items, page manager 710 requests catalog manager 145 for items that are associated with the requested category and generates a page that includes the items received from catalog manager 145. As another example, page manager 710 may receive a request from application 705 to generate a pager for a particular item. In such instances, page manager 710 requests catalog manager 145 for information associated with the item and requests forms manager 135 for a form associated with the item. Page manager 710 then generates a page that includes the information associated with the item and the form and forwards the generated page to application 705.

Administration manager 715 is responsible for creating and managing policies. For example, administration manager 715 may receive a request from application 705 to create a policy. In response to such a request, administration manager generates the policy and stores the policy in policies storage 165. When administration manager 715 receives a request from application 705 to modify or delete a policy, administration manager 715 accesses policies storage 165 to perform the requested operation.

Policy engine 720 is configured to identify policies associated with an item and apply policies at various stages of procuring the item. For example, policy engine 720 may receive a request from application 705 to process policies for a particular item. In response to such a request, policy engine may access policies storage 165 to identify policies associated with the item based on a location associated with a user that is requesting procurement of the item and a category associated with the item. Policy engine 720 may then apply the identified policies to the item and send application 705 results of the application of the policies.

Figure 8:
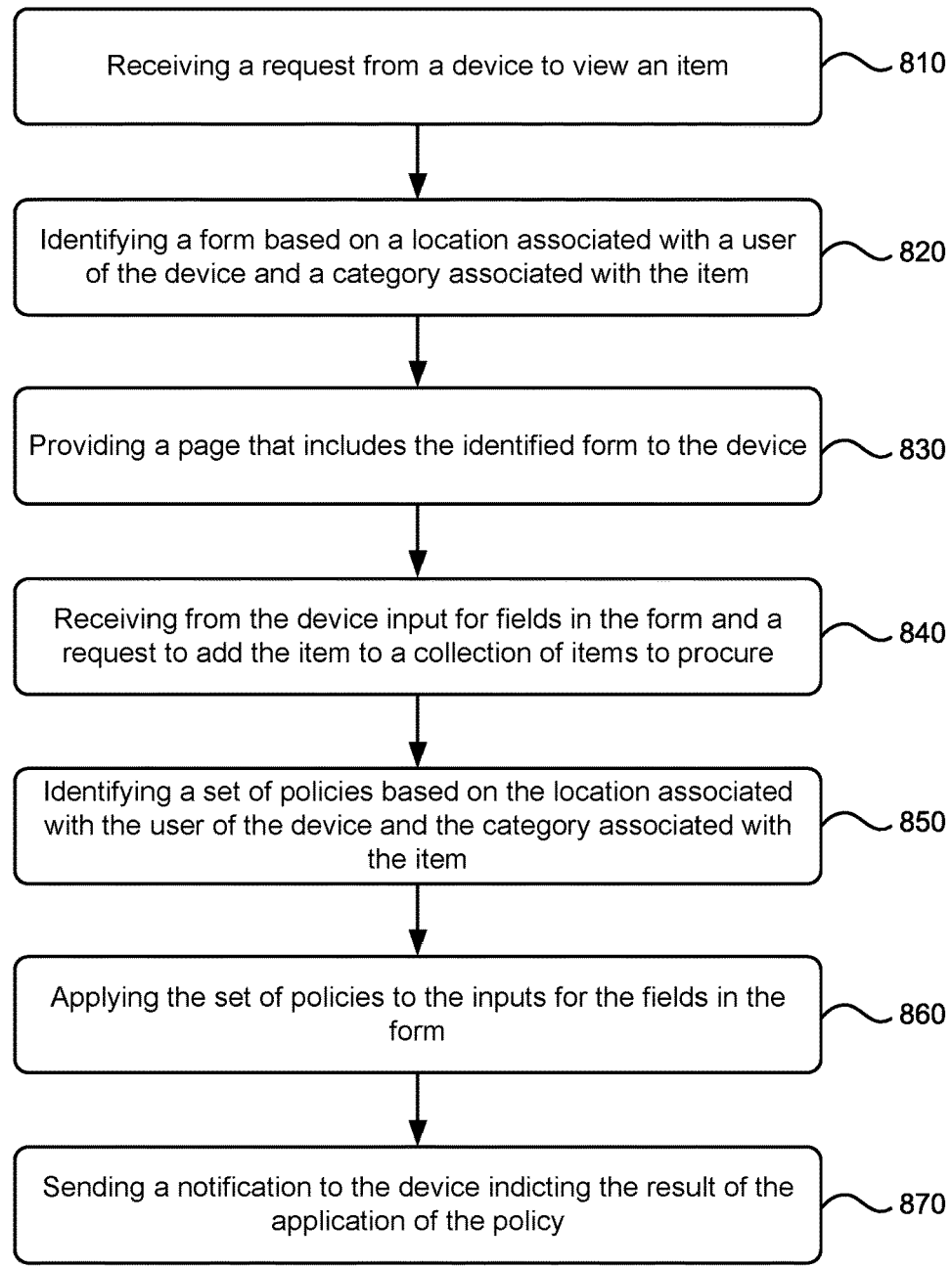
FIG. 8 illustrates a process for procuring items according to some embodiments.

FIG. 8 illustrates a process 800 for procuring items according to some embodiments. In some embodiments, buying manager 115 performs process 800 when buying manager 115 receives a request to procure an item. Process 800 starts by receiving, at 810, a request from a device to view an item. In some embodiments, the request may be received in response to a selection of an item in a page of items associated with a particular category.

Next, process 800 identifying, at 820, a form based on a location associated with a user of the device and a category associated with the item. In some embodiments, process 800 determines the location associated with the user of the device by accessing a storage (e.g., user profiles storage 160) that contains information associated with the user. Process 800 may determine the category associated with the item by accessing a storage (e.g., catalog 150) that contains information associated with the item. As mentioned above, a form includes a set of fields.

Process 800 then provides, at 830, a page that includes the identified form to the device. Referring to FIG. 4B as an example, GUI 400 includes form 405 that is provided to a user of a client device. Next, process 800 receives, at 840, from the device input for the fields in the form and a request to add the item to a collection of items to procure. In some embodiments, process 800 receives the input for the fields in the form and the request via a GUI (e.g., GUI 400) through which the user provides input and sends the request.

In response to the request, process 800 identifies, at 850, a set of policies based on the location associated with the user of the device and the category associated with the item. As described above, a policy may specify a type, a location, a category, and a rule. In some embodiments, process 800 identifies the set of policies by accessing a storage (e.g., policies storage 165) and identifying policies having a location that matches the location associated with the user and a category that matches the category associated with the item.

Next, process 800 applies, at 860, the set of policies to the inputs for the fields in the form. Referring to FIG. 4B as an example, buying manager 115 applies a policy that does not allow gifts of goods valued over $30 to be procured to the data values specified in UI controls 410 and 430. Finally, process 800 sends, at 870, a notification to the device indicating the result of the application of the policy. Continuing with the example in FIG. 4B, buying manager 115 sends client device 190b a notification indicating that a gift of an item with a price over $30 may not be procured since applying the policy to the fields in form 405 resulted in violation of the policy.

Figure 9:
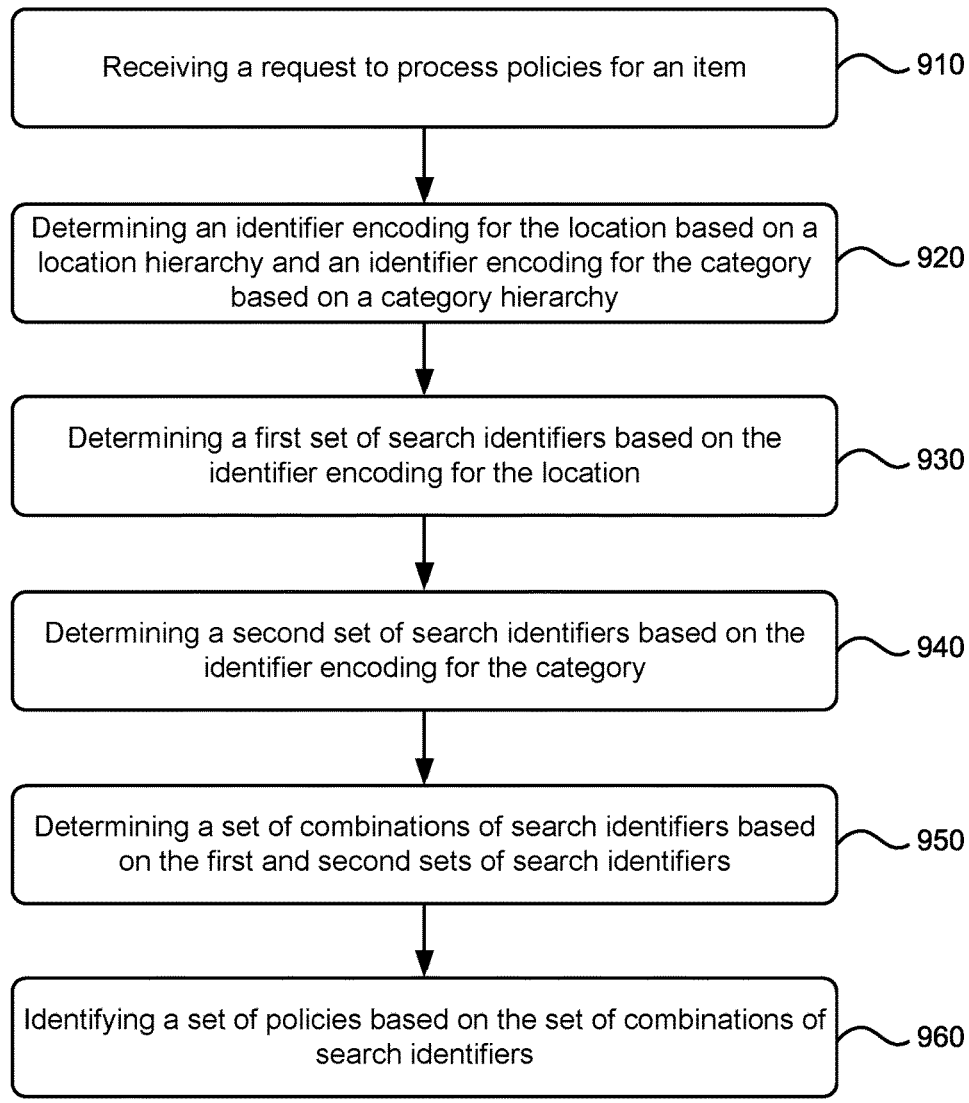
FIG. 9 illustrates a process for processing policies according to some embodiments.
Figure 10:
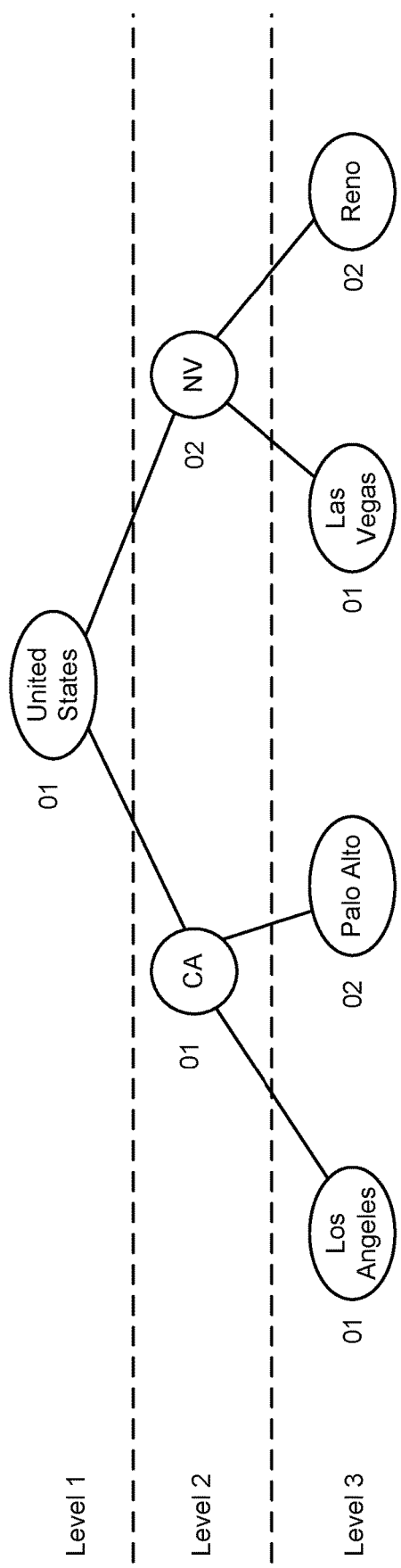
FIG. 10 illustrates an example location hierarchy according to some embodiments.

FIG. 9 illustrates a process 900 for processing policies according to some embodiments. In some embodiments, process 900 is performed as part of operation 850 of process 800. Policy engine 720 may perform process 900. Process 900 will be described by reference to FIGS. 10-12. FIG. 10 illustrates an example location hierarchy 1000 according to some embodiments. As shown, location hierarchy 1000 has three levels. At level 1 of location hierarchy 1000 is a node that represents United States and has a node identifier of 01. Level 2 of location hierarchy 1000 includes two child nodes of the node that represents United States: a node that represents California, which has a node identifier of 01, and a node that represents Nevada, which has a node identifier of 02. Level 3 includes two child nodes of the node that represents California: a node that represents Los Angeles, which has a node identifier of 01, and a node that represents Palo Alto, which has a node identifier of 02. Level 3 also includes two child nodes of the node that represents Nevada: a node that represents Las Vegas, which has a node identifier of 01, and a node that represents Reno, which has a node identifier of 02. As shown in FIG. 10, nodes that are at the same level and belong to the same parent node have different node identifiers.

Figure 11:
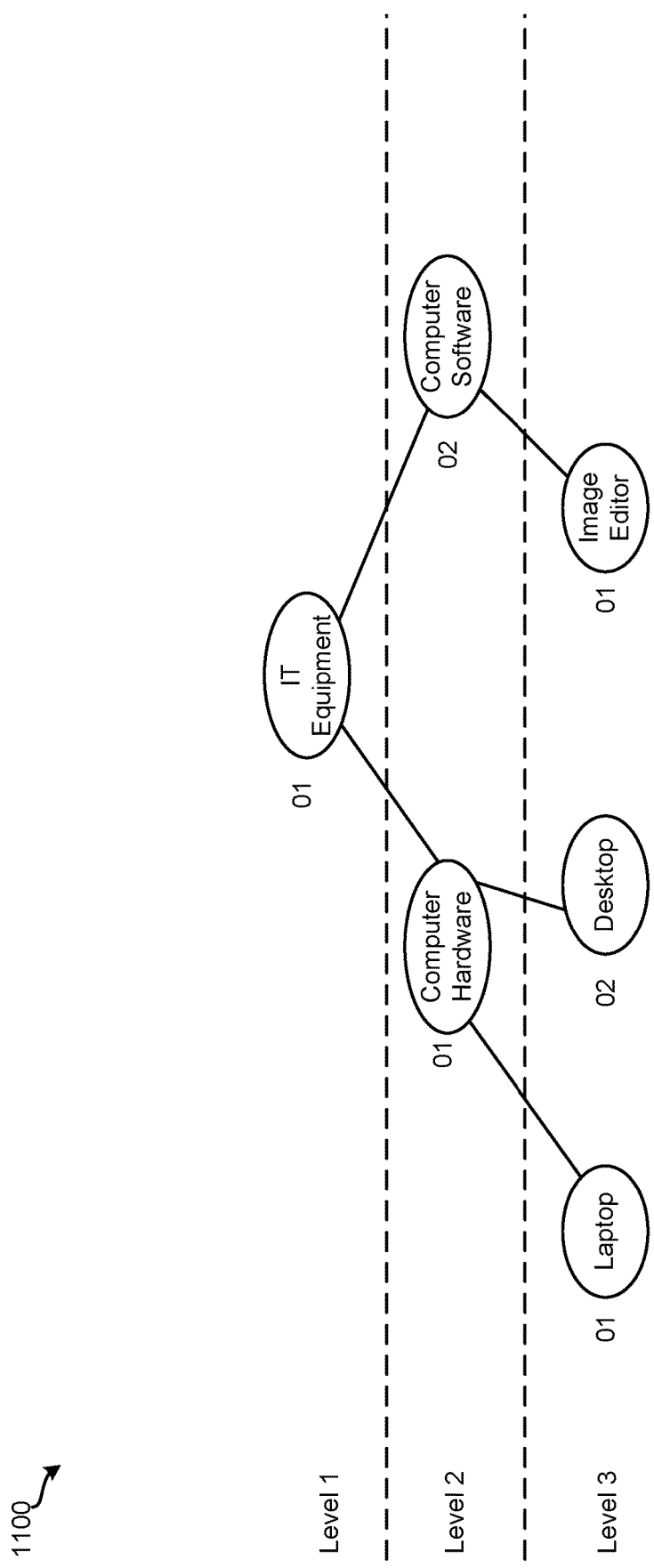
FIG. 11 illustrates an example category hierarchy according to some embodiments.

FIG. 11 illustrates an example category hierarchy 1100 according to some embodiments. As shown, category hierarchy 1100 has three levels. At level 1 of category hierarchy 1100 is a node that represents IT equipment and has a node identifier of 01. Level 2 of location hierarchy 1000 includes two child nodes of the node that represents IT equipment: a node that represents computer hardware, which has a node identifier of 01, and a node that represents computer software, which has a node identifier of 02. Level 3 includes two child nodes of the node that represents computer hardware: a node that represents laptop, which has a node identifier of 01, and a node that represents desktop, which has a node identifier of 02. Level 3 also includes child node of the node that represents computer software: a node that represents image editor, which has a node identifier of 01. As shown in FIG. 11, nodes that are at the same level and belong to the same parent node have different node identifiers.

FIG. 12 illustrates example policies that are defined according to the hierarchies illustrated in FIGS. 10 and 11. Specifically, FIG. 12 shows a table 1200 of six policies. Each policy has a location field, a category field, a type field, and a rule field. As explained above, a policy specifies a type, a location, a category, and a rule, in some embodiments. In this example, the value (also referred to as an identifier encoding) in the location field of a policy represents a particular node in location hierarchy 1000. The value is determined by concatenating the node identifiers of nodes along the traversal path to the particular node. For example, the location field of the first policy specifies the Palo Alto node in location hierarchy 1000. The value 010102 is the concatenation of the node identifiers of the nodes along the path to Palo Alto, which in this case is the concatenation of the node identifier that represents United States (01), the node identifier that represents California (01), and the node identifier that represents Palo Alto (02). Similarly, the value (also referred to as an identifier encoding) in the category field in a policy represents a particular node in category hierarchy 1100. The value is determined by concatenating the node identifiers of nodes along the traversal path to the particular node. For example, the category field of the first policy specifies the laptop node in category hierarchy 1100. The value 010101 is the concatenation of the node identifiers of the nodes along the path to laptop, which in this case is the concatenation of the node identifier that represents IT equipment (01), the node identifier that represents computer hardware (01), and the node identifier that represents laptop (01).

According to the techniques described above for encoding the location field and the category field, the second policy specifies California for the location field and computer software for the category field, the third policy specifies Palo Alto for the location field and computer hardware for the category field, the fourth policy specifies California for the location field and computer hardware for the category field, the fifth policy specifies Nevada for the location field and computer hardware for the category field, and the sixth policy specifies United States for the location field and computer hardware for the category field. The same techniques are utilized for encoding the location and the category in the example described below.

Returning to FIG. 9, process 900 begins by receiving, at 910, a request to process policies for an item based on a location associated with a user and a category associated with the item. As an example, process 900 may receive a request to process shopping policies for an item that is requested by a user located in Palo Alto and is associated with the computer hardware category.

Next, process 900 determines, at 920, an identifier encoding for the location based on a location hierarchy and an identifier encoding for the category based on a category hierarchy. Continuing with the example above, process 900 determines that the identifier encoding for Palo Alto is 010102 and the identifier encoding for computer hardware is 0101.

Process 900 then determines, at 930, a first set of search identifiers based on the identifier encoding for the location. In some embodiments, the first set of search identifiers includes the identifier encoding of each node in the traversal path to the location in the location hierarchy. Continuing with the example above, the first set of search identifiers for Palo Alto includes three identifier encodings of the three nodes in the traversal path to Palo Alto in location hierarchy 1000:, United States (01), California (0101), and Palo Alto (010102).

Next, process 900 determines, at 940, a second set of search identifiers based on the identifier encoding for the category. In some embodiments, the second set of search identifiers includes the identifier encoding of each node in the traversal path to the category in the category hierarchy. Continuing with the example above, the second set of search identifiers for computer hardware includes two identifier encodings of the two nodes in the traversal path to computer hardware in category hierarchy 1100: IT equipment (01) and computer hardware (0101).

Process 900 then determines, at 950, a set of combinations of search identifiers based on the first and second sets of search identifiers. In some embodiments, the set of combinations of search identifiers includes every distinct combination of a search identifier from the first set of search identifiers and a search identifier form the second set of search identifiers. Continuing with the example above, the set of combinations of search identifiers are illustrated in the following Table 1:

TABLE 1

| Location | Category |
|---|---|
| 01 | 01 |
| 01 | 0101 |
| 0101 | 01 |
| 0101 | 0101 |
| 010102 | 01 |
| 010102 | 0101 |

Finally, process 900 identifies, at 960, a set of policies based on the set of combinations of search identifiers. In some embodiments, process 900 identifies the set of policies by searching through policies (e.g., policies stored in policies storage 165) and including a particular policy in the set of policies when the location and the category of the particular policy matches a combination of search identifiers in the set of combinations of search identifiers. Continuing with the example above, process 900 identifies the third policy in policy table 1200 because the location and category of the third policy matches the sixth combination of search identifiers in Table 1 and the policy type is a shopping policy. Process 900 also identifies the fourth policy in policy table 1200 because the location and category of the third policy matches the fourth combination of search identifiers in Table 1 and the policy type is a shopping policy. While the location and category of the sixth policy in policy table 1200 matches the second combination of search identifiers in Table 1, process 900 does not include the six policy because the policy type of the sixth policy is not a shopping policy.

Figure 13:
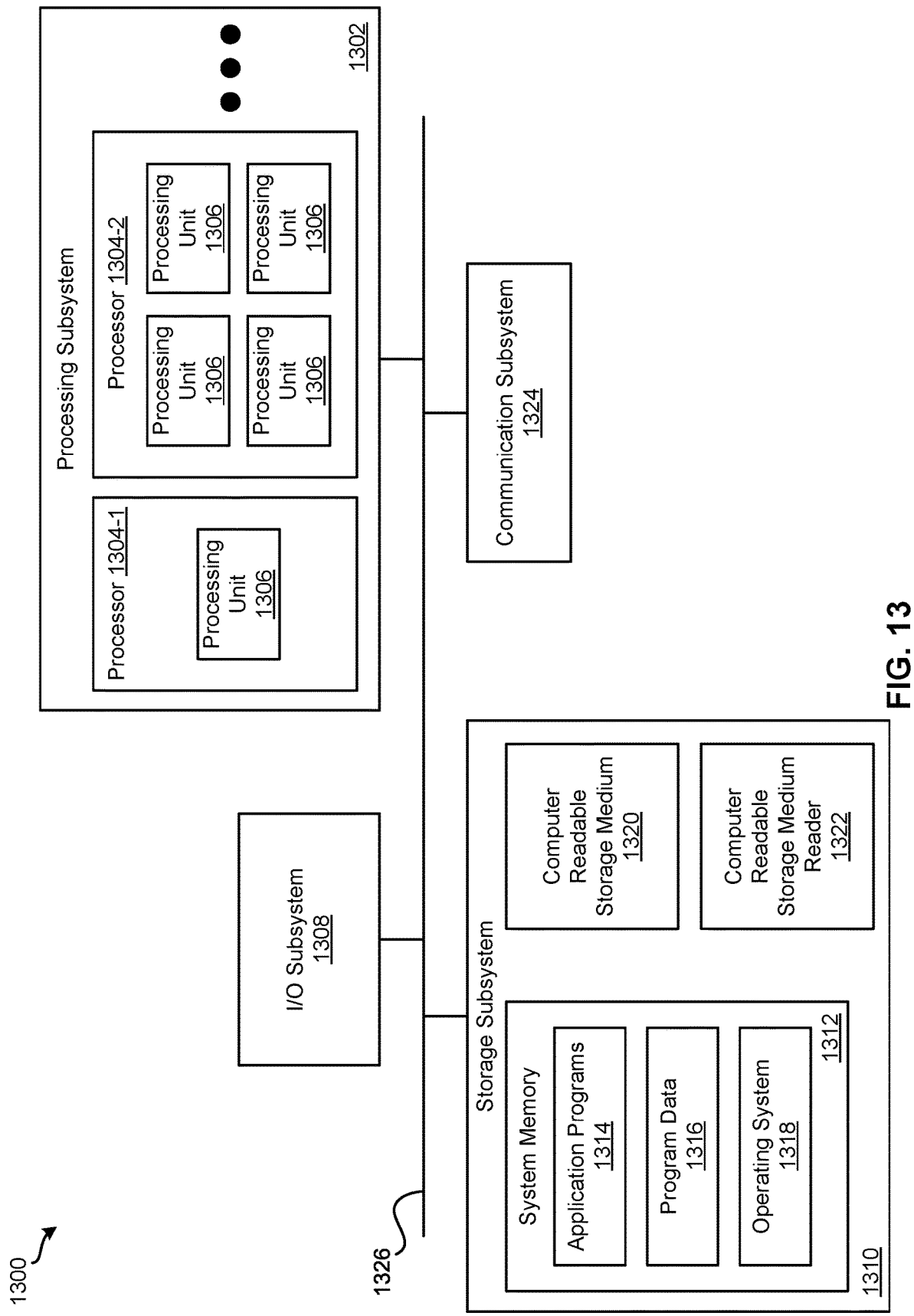
FIG. 13 illustrates an exemplary computer system, in which various embodiments may be implemented

FIG. 13 illustrates an exemplary computer system 1300, in which various embodiments may be implemented. For example, computer system 1300 may be used to implement client devices 190a-n and procurement system 110 described above by reference to FIGS. 1, 2, and 5. Computer system 1300 may be a desktop computer, a laptop, a server computer, or any other type of computer system or combination thereof. Some or all elements of procurement system 110 or combinations thereof can be included or implemented in computer system 1300. In addition, computer system 1300 can implement many of the operations, methods, and/or processes described above (e.g., process 800 and process 900). As shown in FIG. 13, computer system 1300 includes processing subsystem 1302, which communicates, via bus subsystem 1302, with input/output (I/O) subsystem 1308, storage subsystem 1310 and communication subsystem 1324.

Bus subsystem 1302 is configured to facilitate communication among the various components and subsystems of computer system 1300. While bus subsystem 1302 is illustrated in FIG. 13 as a single bus, one of ordinary skill in the art will understand that bus subsystem 1302 may be implemented as multiple buses. Bus subsystem 1302 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1302, which can be implemented as one or more integrated circuits (e.g., a conventional microprocessor or microcontroller), controls the operation of computer system 1300. Processing subsystem 1302 may include one or more processors 1304. Each processor 1304 may include one processing unit 1306 (e.g., a single core processor such as processor 1304-1) or several processing units 1306 (e.g., a multicore processor such as processor 1304-2). In some embodiments, processors 1304 of processing subsystem 1302 may be implemented as independent processors while, in other embodiments, processors 1304 of processing subsystem 1302 may be implemented as multiple processors integrate into a single chip or multiple chips. Still, in some embodiments, processors 1304 of processing subsystem 1302 may be implemented as a combination of independent processors and multiple processors integrated into a single chip or multiple chips.

In some embodiments, processing subsystem 1302 can execute a variety of programs or processes in response to program code and can maintain multiple concurrently executing programs or processes. At any given time, some or all of the program code to be executed can reside in processing subsystem 1302 and/or in storage subsystem 1310. Through suitable programming, processing subsystem 1302 can provide various functionalities, such as the functionalities described above by reference to process 800 and process 900, etc.

I/O subsystem 1308 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1300 to a user or another device (e.g., a printer).

As illustrated in FIG. 13, storage subsystem 1310 includes system memory 1312, computer-readable storage medium 1320, and computer-readable storage medium reader 1322. System memory 1312 may be configured to store software in the form of program instructions that are loadable and executable by processing subsystem 1302 as well as data generated during the execution of program instructions. In some embodiments, system memory 1312 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1312 may include different types of memory, such as static random access memory (SRAM) and/or dynamic random access memory (DRAM). System memory 1312 may include a basic input/output system (BIOS), in some embodiments, that is configured to store basic routines to facilitate transferring information between elements within computer system 1300 (e.g., during start-up). Such a BIOS may be stored in ROM (e.g., a ROM chip), flash memory, or any other type of memory that may be configured to store the BIOS.

As shown in FIG. 13, system memory 1312 includes application programs 1314, program data 1316, and operating system (OS) 1318. OS 1318 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1320 may be a non-transitory computer-readable medium configured to store software (e.g., programs, code modules, data constructs, instructions, etc.). Many of the components (e.g., buying manager 115, supplier network manager 120, sourcing manager 125, procurement manager 130, forms manager 135, supplier manager 140, and catalog manager 145) and/or processes (e.g., process 800 and process 900) described above may be implemented as software that when executed by a processor or processing unit (e.g., a processor or processing unit of processing subsystem 1302) performs the operations of such components and/or processes. Storage subsystem 1310 may also store data used for, or generated during, the execution of the software.

Storage subsystem 1310 may also include computer-readable storage medium reader 1322 that is configured to communicate with computer-readable storage medium 1320. Together and, optionally, in combination with system memory 1312, computer-readable storage medium 1320 may comprehensively represent remote, local, fixed, and/or removable storage devices plus storage media for temporarily and/or more permanently containing, storing, transmitting, and retrieving computer-readable information.

Computer-readable storage medium 1320 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1324 serves as an interface for receiving data from, and transmitting data to, other devices, computer systems, and networks. For example, communication subsystem 1324 may allow computer system 1300 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1324 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1324 may provide components configured for wired communication (e.g., Ethernet) in addition to or instead of components configured for wireless communication.

One of ordinary skill in the art will realize that the architecture shown in FIG. 13 is only an example architecture of computer system 1300, and that computer system 1300 may have additional or fewer components than shown, or a different configuration of components. The various components shown in FIG. 13 may be implemented in hardware, software, firmware or any combination thereof, including one or more signal processing and/or application specific integrated circuits.

Figure 14:
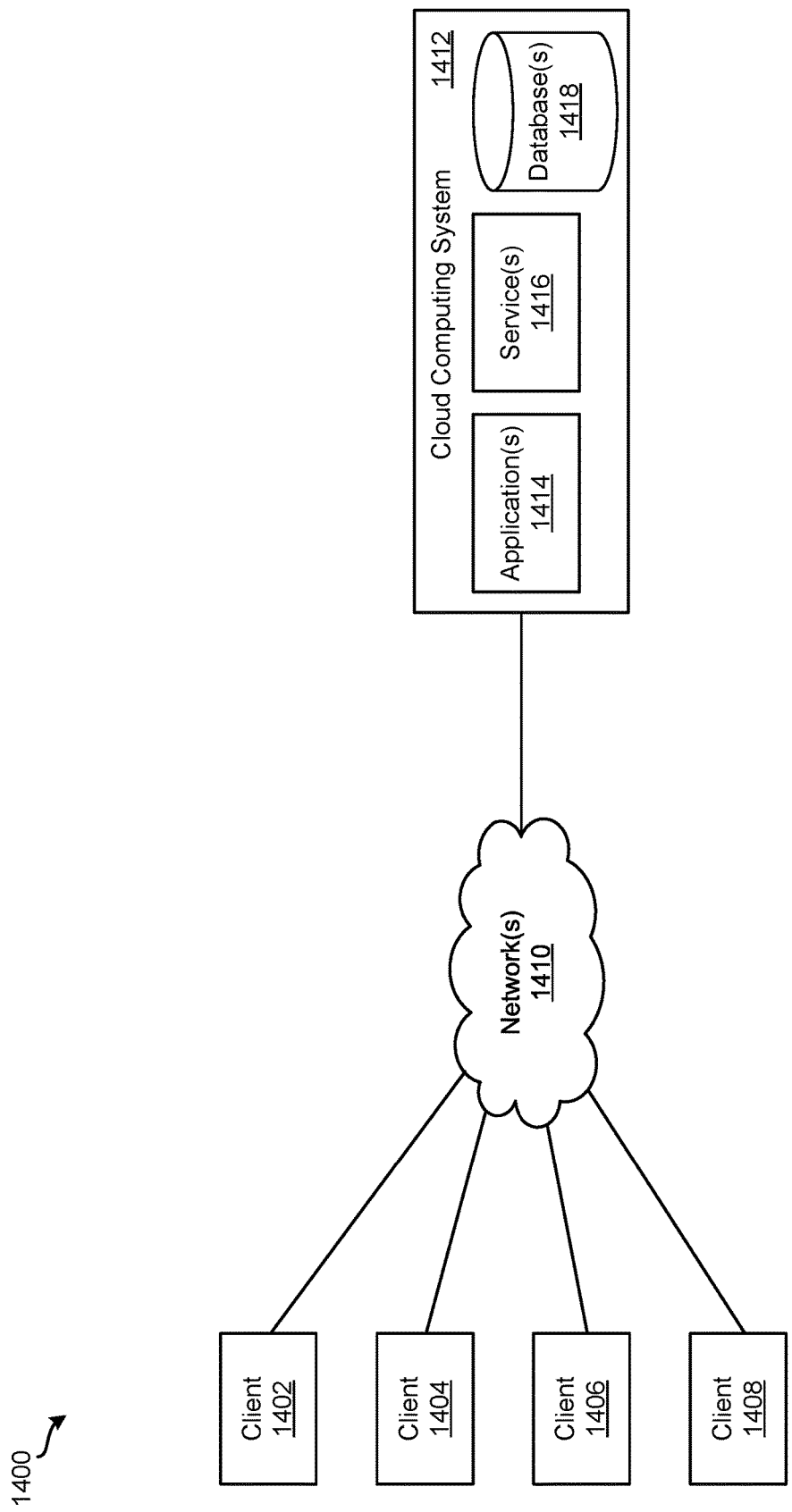
FIG. 14 illustrates system for implementing various embodiments described above.

FIG. 14 illustrates system 1400 for implementing various embodiments described above. For example, cloud computing system 1412 of system 1400 may be used to implement procurement system 110. As shown, system 1400 includes client devices 1402-1408, one or more networks 1410, and cloud computing system 1412. Cloud computing system 1412 is configured to provide resources and data to client devices 1402-1408 via networks 1410. In some embodiments, cloud computing system 1400 provides resources to any number of different users (e.g., customers, tenants, organizations, etc.). Cloud computing system 1412 may be implemented by one or more computer systems (e.g., servers), virtual machines operating on a computer system, or a combination thereof.

As shown, cloud computing system 1412 includes one or more applications 1414, one or more services 1416, and one or more databases 1418. Cloud computing system 1400 may provide applications 1414, services 1416, and databases 1418 to any number of different customers in a self-service, subscription-based, elastically scalable, reliable, highly available, and secure manner.

In some embodiments, cloud computing system 1400 may be adapted to automatically provision, manage, and track a customer's subscriptions to services offered by cloud computing system 1400. Cloud computing system 1400 may provide cloud services via different deployment models. For example, cloud services may be provided under a public cloud model in which cloud computing system 1400 is owned by an organization selling cloud services and the cloud services are made available to the general public or different industry enterprises. As another example, cloud services may be provided under a private cloud model in which cloud computing system 1400 is operated solely for a single organization and may provide cloud services for one or more entities within the organization. The cloud services may also be provided under a community cloud model in which cloud computing system 1400 and the cloud services provided by cloud computing system 1400 are shared by several organizations in a related community. The cloud services may also be provided under a hybrid cloud model, which is a combination of two or more of the aforementioned different models.

In some instances, any one of applications 1414, services 1416, and databases 1418 made available to client devices 1402-1408 via networks 1410 from cloud computing system 1400 is referred to as a "cloud service." Typically, servers and systems that make up cloud computing system 1400 are different from the on-premises servers and systems of a customer. For example, cloud computing system 1400 may host an application and a user of one of client devices 1402-1408 may order and use the application via networks 1410.

Applications 1414 may include software applications that are configured to execute on cloud computing system 1412 (e.g., a computer system or a virtual machine operating on a computer system) and be accessed, controlled, managed, etc. via client devices 1402-1408. In some embodiments, applications 1414 may include server applications and/or mid-tier applications (e.g., HTTP (hypertext transport protocol) server applications, FTP (file transfer protocol) server applications, CGI (common gateway interface) server applications, JAVA server applications, etc.) Services 1416 are software components, modules, application, etc. that are configured to execute on cloud computing system 1412 and provide functionalities to client devices 1402-1408 via networks 1410. Services 1416 may be web-based services or on-demand cloud services.

Databases 1418 are configured to store and/or manage data that is accessed by applications 1414, services 1416, and/or client devices 1402-1408. Databases 1418 may reside on a non-transitory storage medium local to (and/or resident in) cloud computing system 1412, in a storage-area network (SAN), on a non-transitory storage medium local located remotely from cloud computing system 1412. In some embodiments, databases 1418 may include relational databases that are managed by a relational database management system (RDBMS). Databases 1418 may be a column-oriented databases, row-oriented databases, or a combination thereof. In some embodiments, some or all of databases 1418 are in-memory databases. That is, in some such embodiments, data for databases 1418 are stored and managed in memory (e.g., random access memory (RAM)).

Client devices 1402-1408 are configured to execute and operate a client application (e.g., a web browser, a proprietary client application, etc.) that communicates with applications 1414, services 1416, and/or databases 1418 via networks 1410. This way, client devices 1402-1408 may access the various functionalities provided by applications 1414, services 1416, and databases 1418 while applications 1414, services 1416, and databases 1418 are operating (e.g., hosted) on cloud computing system 1400. Client devices 1402-1408 may be computer system 1000. Although system 1400 is shown with four client devices, any number of client devices may be supported.

Networks 1410 may be any type of network configured to facilitate data communications among client devices 1402-1408 and cloud computing system 1412 using any of a variety of network protocols. Networks 1410 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory computer-readable medium storing a program executable by at least one processing unit of a device, the program comprising instructions for:
    providing a set of items in a graphical user interface (GUI) to a client device;
    receiving, from the client device, a selection of an item in the set of items provided in the GUI;
    determining a category associated with the item and a location associated with a user of the client device;
    identifying a form from a plurality of forms based on the category and the location, the form comprising a set of fields, wherein each form in the plurality of forms stores a category and a location, wherein the identified form stores the location associated with the user and the category associated with the item;
    providing, through the GUI, the form to the client device;
    receiving, through the GUI, data values for the set of fields from the client device and a request to add the item to a collection of items;
    accessing a storage configured to store a plurality of policies, each policy in the plurality of policies comprising a location, a category, and a rule;
    identifying, from the plurality of policies stored in the storage, a set of policies based on the location associated with the user, the category associated with the item, a first hierarchy of locations, and a second hierarchy of categories, each policy in the set of policies having a location that matches the location associated with the user of the client device and a category that matches the category associated with the item;

applying the set of policies to the data values for the set of fields;

based on the application of the set of policies, determining whether to allow the item to be added to the collection of items; and sending a notification to the client device indicating whether the item is allowed to be added to the collection of items.

2. The non-transitory computer-readable medium of claim 1, wherein the set of policies is a first set of policies, wherein the program further comprises instructions for:

receiving a request for the item and requisition information associated with the item;

in response to the request, identifying a second set of policies based on the category and the location; and applying the second set of policies to the requisition information.

3. The non-transitory computer-readable medium of claim 1, wherein determining whether to allow the item to be added to the collection of items comprises:

upon determining that the item cannot be added to the collection of items, preventing the item from being added to the collection of items, and upon determining that the item can be added to the collection of items, adding the item to the collection of items.

4. The non-transitory computer-readable medium of claim 1, wherein the rule of each policy in the set of policies comprises a set of conditions and a set of operations to perform when the set of conditions are met.

5. The non-transitory computer-readable medium of claim 4, wherein the location of each policy in the set of policies matches the location associated with the user of the client device and the category of the policy matches the category associated with the item, wherein the set of conditions of the rule of a particular policy in the identified set of policies comprises a condition that a data value provided for a field in the set of fields of the form is greater than a defined value, wherein the set of operations of the rule of the particular policy comprises an operation to provide a notification indicating that an item cannot be procured.

6. The non-transitory computer-readable medium of claim 1, wherein determining the location associated with user of the client device comprises accessing a storage of the device configured to store a plurality of user profiles to identify the location associated with the user.

7. The non-transitory computer-readable medium of claim 1, wherein determining the category associated with the item comprises accessing a storage of the device configured to store a plurality of items to identify the category associated with the item.

8. A method, executable by a device comprising:

providing a set of items in a graphical user interface (GUI) to a client device;

receiving, from the client device, a selection of an item in the set of items provided in the GUI;

determining a category associated with the item and a location associated with a user of the client device;

identifying a form from a plurality of forms based on the category and the location, the form comprising a set of fields, wherein each form in the plurality of forms stores a category and a location, wherein the identified form stores the location associated with the user and the category associated with the item;

providing, through the GUI, the form to the client device;

receiving, through the GUI, data values for the set of fields from the client device and a request to add the item to a collection of items;

accessing a storage configured to store a plurality of policies, each policy in the plurality of policies comprising a location, a category, and a rule;

identifying, from the plurality of policies stored in the storage, a set of policies based on the location associated with the user, the category associated with the item, a first hierarchy of locations, and a second hierarchy of categories, each policy in the set of policies having a location that matches the location associated with the user of the client device and a category that matches the category associated with the item;

applying the set of policies to the data values for the set of fields;

based on the application of the set of policies, determining whether to allow the item to be added to the collection of items; and sending a notification to the client device indicating whether the item is allowed to be added to the collection of items.

9. The method of claim 8, wherein the set of policies is a first set of policies, the method further comprising:

receiving a request for the item and requisition information associated with the item;

in response to the request, identifying a second set of policies based on the category and the location; and applying the second set of policies to the requisition information.

10. The method of claim 8, wherein determining whether to allow the item to be added to the collection of items comprises:

upon determining that the item cannot be added to the collection of items, preventing the item from being added to the collection of items, and upon determining that the item can be added to the collection of items, adding the item to the collection of items.

11. The method of claim 8, wherein the rule of each policy in the set of policies comprises a set of conditions and a set of operations to perform when the set of conditions are met.

12. The method of claim 11, wherein the location of each policy in the set of policies matches the location associated with the user of the client device and the category of the policy matches the category associated with the item, wherein the set of conditions of the rule of a particular policy in the identified set of policies comprises a condition that a data value provided for a field in the set of fields of the form is greater than a defined value, wherein the set of operations of the rule of the particular policy comprises an operation to provide a notification indicating that an item cannot be procured.

13. The method of claim 8, wherein determining the location associated with user of the client device comprises accessing a storage of the device configured to store a plurality of user profiles to identify the location associated with the user.

14. The method of claim 8, wherein determining the category associated with the item comprises accessing a storage of the device configured to store a plurality of items to identify the category associated with the item.

15. A system comprising:

a set of processing units; and a non-transitory computer-readable medium storing instructions that when executed by at least one processing unit in the set of processing units cause the at least one processing unit to:

provide a set of items in a graphical user interface (GUI) to a client device;

receive, from the client device, a selection of an item in the set of items provided in the GUI;

determine a category associated with the item and a location associated with a user of the client device;

identify a form from a plurality of forms based on the category and the location, the form comprising a set of fields, wherein each form in the plurality of forms stores a category and a location, wherein the identified form stores the location associated with the user and the category associated with the item;

provide, through the GUI, the form to the client device;

receive, through the GUI, data values for the set of fields from the client device and a request to add the item to a collection of items;

access a storage configured to store a plurality of policies, each policy in the plurality of policies comprising a location, a category, and a rule;

identify, from the plurality of policies stored in the storage, a set of policies based on the location associated with the user, the category associated with the item, a first hierarchy of locations, and a second hierarchy of categories, each policy in the set of policies having a location that matches the location associated with the user of the client device and a category that matches the category associated with the item;

apply the set of policies to the data values for the set of fields;

based on the application of the set of policies, determine whether to allow the item to be added to the collection of items; and send a notification to the client device indicating whether the item is allowed to be added to the collection of items.

16. The system of claim 15, wherein the set of policies is a first set of policies, wherein the instructions further cause the at least one processing unit to:

receive a request for the item and requisition information associated with the item;

in response to the request, identify a second set of policies based on the category and the location; and apply the second set of policies to the requisition information.

17. The system of claim 15, wherein determining whether to allow the item to be added to the collection of items comprises:

upon determining that the item cannot be added to the collection of items, preventing the item from being added to the collection of items, and upon determining that the item can be added to the collection of items, adding the item to the collection of items.

18. The system of claim 15, wherein the rule of each policy in the set of policies comprises a set of conditions and a set of operations to perform when the set of conditions are met.

19. The system of claim 18, wherein the location of each policy in the set of policies matches the location associated with the user of the client device and the category of the policy matches the category associated with the item, wherein the set of conditions of the rule of a particular policy in the identified set of policies comprises a condition that a data value provided for a field in the set of fields of the form is greater than a defined value, wherein the set of operations of the rule of the particular policy comprises an operation to provide a notification indicating that an item cannot be procured.

20. The system of claim 15, wherein determining the location associated with user of the client device comprises accessing a first storage of the system configured to store a plurality of user profiles to identify the location associated with the user, wherein determining the category associated with the item comprises accessing a second storage of the system configured to store a plurality of items to identify the category associated with the item.

* * * * *